(12) United States Patent
Siegel et al.

(10) Patent No.: US 6,508,279 B2
(45) Date of Patent: Jan. 21, 2003

(54) AUTOMATED SOLID PHARMACEUTICAL PRODUCT PACKAGING MACHINE WITH PARALLEL FILLING AND SEALING CAPABILITY

(75) Inventors: Todd Siegel, Clearwater, FL (US); Stuart Bagley, Clearwater, FL (US)

(73) Assignee: Medical Technology Systems, Inc., Clearwater, FL (US)

( * ) Notice: Subject to any disclaimer, the term of this patent is extended or adjusted under 35 U.S.C. 154(b) by 0 days.

(21) Appl. No.: 09/840,758

(22) Filed: Apr. 23, 2001

(65) Prior Publication Data

US 2002/0153056 A1 Oct. 24, 2002

(51) Int. Cl.[7] .............................. B65B 1/04; B65B 3/04
(52) U.S. Cl. ...................... 141/2; 141/234; 141/238; 141/246; 141/253; 141/275; 141/284; 53/390; 53/473
(58) Field of Search .................... 141/247, 248, 141/144, 234, 236, 238, 240, 246, 250–254, 275, 284, 2; 53/281, 473, 390

(56) References Cited

U.S. PATENT DOCUMENTS

| | | | | | |
|---|---|---|---|---|---|
| 4,398,578 A | * | 8/1983 | Walters et al. | ............... | 141/238 |
| 4,629,093 A | * | 12/1986 | Le Molaire | ................. | 141/129 |
| 4,884,602 A | * | 12/1989 | Yamamoto et al. | ......... | 141/242 |
| 5,010,929 A | * | 4/1991 | Tisma | ........................... | 141/1 |
| 5,797,248 A | * | 8/1998 | Hetherington et al. | ........ | 53/473 |

* cited by examiner

Primary Examiner—Timothy L. Maust
(74) Attorney, Agent, or Firm—Robert J. Depke; Holland & Knight LLC

(57) ABSTRACT

An automated pharmaceutical package machine fills a product package filling guide positioned above a solid pharmaceutical product package having a plurality of cavities corresponding to positions of the filling guide. The automatic filling machine includes a mechanism for vertically displacing the product package to be filled toward the filling guide. Various guide members or plates are utilized in order to pre-fill filling templates so that each of the cavities of a product package may be simultaneously filled.

8 Claims, 7 Drawing Sheets

AUTOMATED SOLID PHARMACEUTICAL PRODUCT PACKAGING MACHINE WITH PARALLEL FILLING AND SEALING CAPABILITY

BACKGROUND OF THE INVENTION

1. Field of the Invention

The present invention relates generally to the field of automated pharmaceutical packaging machines. More specifically, the present invention is directed to an automated pharmaceutical package machine which fills a product package filling guide positioned above a solid pharmaceutical product package having a plurality of cavities corresponding to positions of the filling guide. The automatic filling machine includes a mechanism for vertically displacing the product package to be filled in toward the filling guide.

2. Description of the Related Art

There are currently a wide variety of automated pharmaceutical product packaging machines available. The majority of these machines are designed for packaging single pharmaceutical product into pharmaceutical package material. The machines typically transfer individual doses of solid pharmaceutical products into a cavity formed within a clear plastic cover member. Usually a plurality of cavities are formed in a single sheet of clear plastic material and its corresponding plurality of pharmaceutical products are inserted by the filling machine. Once the solid pharmaceutical members have been inserted into the cavities, a backing material is then adhesively applied to the clear plastic sheet to seal the solid pharmaceutical products within the cavities.

In one prior solid pharmaceutical packaging machine a product package filling guide is filled with solid pharmaceuticals and thereafter the solid pharmaceuticals are dropped into corresponding cavities of a solid pharmaceutical product package card. One of the shortcomings of this prior machine is in the positioning of the solid pharmaceutical product package card in relation to the filling guide during the filling process. It has been found that by placing the solid pharmaceutical product package too far beneath the product package filling guide, during the filling process, depending upon the size of the pill involved, the pill may bounce either out of the product package altogether or from a desired cavity into an adjacent product package cavity. This erroneous placement of patient dosages can result in inadvertently altering the dosing for a particular patient.

Alternatively, by having the product package too close to the product package filling guide during the filling process, when the pharmaceutical product guide member slides horizontally away from the product package template, pills that may be large and extend above a top plane of the product packaging material may be sheared off by the product package filling guide as the product package moves horizontally in relation to the template. The present inventors have overcome the shortcomings and deficiencies of the prior art and identified a solution to these problems.

SUMMARY OF THE INVENTION

The present invention is directed to an automated pharmaceutical product packaging machine which includes a vertical displacement mechanism for adjusting the relative height of a solid pharmaceutical product package to be filled in relation to a product package filling guide. In accordance with the present invention, an automated filling machine fills a product package filling guide with desired solid pharmaceuticals. The filling guide is comprised of a plurality of plates having openings which correspond to product package cavities on a sheet of solid pharmaceutical packaging material. During the filling process, a machine selectively deposits a desired number of solid pharmaceuticals into the corresponding cavities or openings of an upper most initial filling guide plate and adjacent guide plate of the product package filling guide mechanism. Packaging material to be filled with the solid pharmaceuticals located within the product package filling guide is then positioned beneath the solid pharmaceutical product package filling guide members with a dropping guide member located therebetween.

A vertical displacing mechanism then drives the product packaging material upward towards a bottom surface of the lower most product package filling guide or dropping guide member. Thereafter, the middle solid pharmaceutical filling guide member or members are horizontally displaced in order to allow the solid pharmaceuticals contained in the openings in the filling guide to fall into corresponding cavities of the solid pharmaceutical product packaging material. The vertical displacement mechanism ensures that the individual solid pharmaceuticals will not bounce from one cavity of the packaging to another when they drop from the product package filling guide into the respective cavities in the product packaging material. Furthermore, the systems and methods of the present invention prevent the individual solid pharmaceutical doses from being damaged or sheared during the automated filling process because immediately after the package has been filled, the package material is dropped downward to eliminate the potential for shearing of pills.

Once the solid pharmaceuticals have been dropped into the desired cavities of the packaging material, the vertical displacement mechanism lowers the product packaging material containing the solid pharmaceutical members. Thereafter, the product packaging material traverses to an inspection station wherein an operator ensures that each of the cavities have the appropriate number of solid pharmaceutical members. Finally, the system traverses the solid pharmaceutical product package to an inspection station and then a sealing station where the package is sealed.

DETAILED DESCRIPTION OF THE PREFERRED EMBODIMENTS

Figure 1:
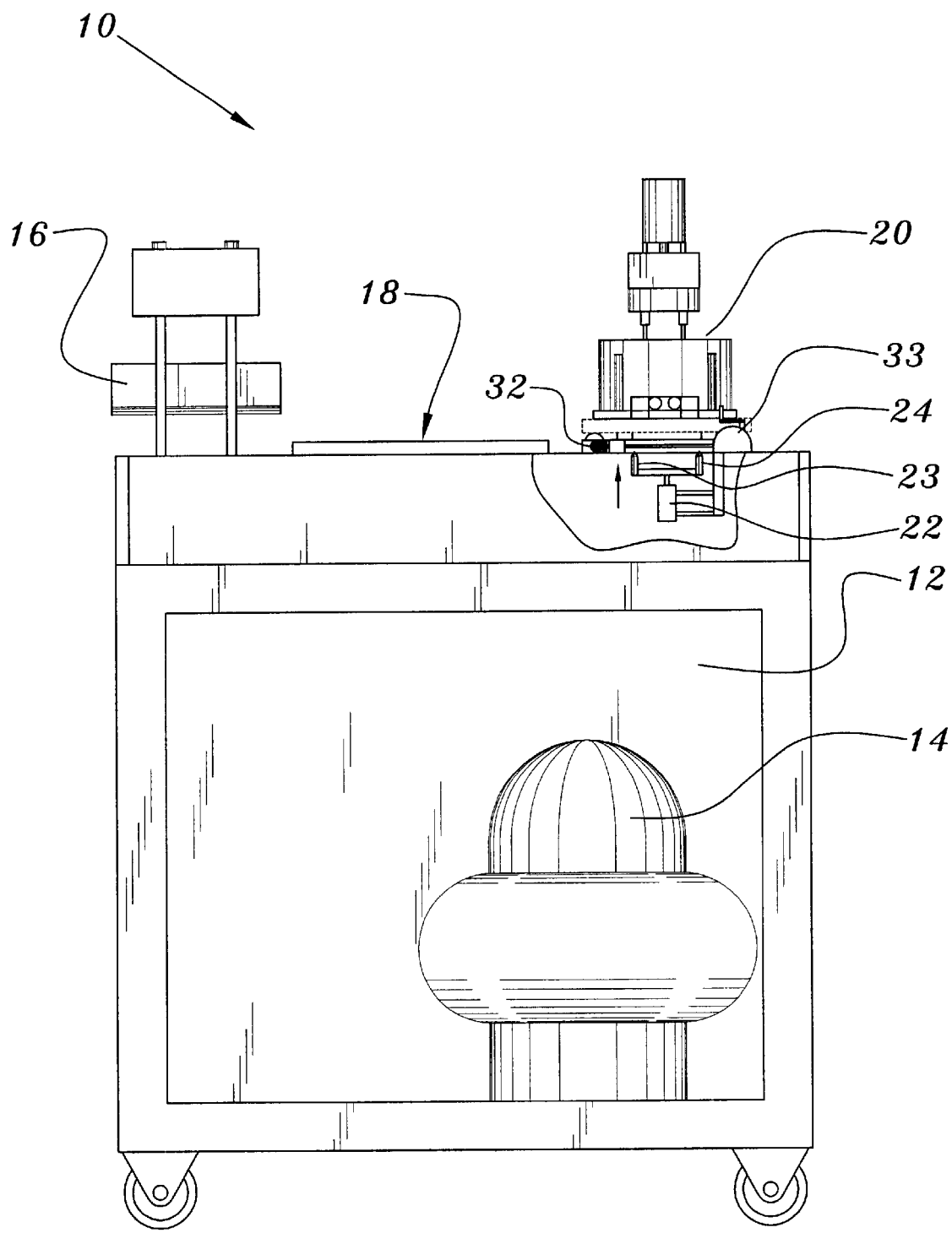
FIG. 1 is a side view of one exemplary embodiment of the present invention.

FIG. 1 illustrates a side view of a first preferred exemplary embodiment of the present invention which is shown generally at 10. In accordance with an exemplary embodiment of the present invention, a mobile automated solid pharmaceutical filling station 12 is comprised of an air compressor 14 for driving compressed air drive mechanisms that may be used to manipulate the various stations on the machine 12. As shown in FIG. 1, a sealing station 16 as is known in the art is used to seal solid pharmaceutical packaging material once the desired pharmaceuticals have been inserted into the desired package cavities. An inspection station/package material deposit station 18 is adjacent to the sealing station 16.

Solid pharmaceutical filling station 20 is adjacent inspection station 18 and advantageously incorporates a vertical drive mechanism 22 for adjusting a height of the pharmaceutical package in relation to a product package filling guide as will be described below. As shown in FIG. 1, the vertical drive mechanism 22 is comprised of pneumatic lifting a drive pistons 23, 24 which are used to lift the product package support or platten as described in more detail below. Those skilled in the art will appreciate that the vertical drive mechanism is not necessarily pneumatic and that alternate mechanical displacement mechanisms may be utilized as well. For example, the vertical drive 22 may be comprised of cams, solenoid drives, electromagnetic displacement mechanisms or any other known device for lifting a body. FIG. 1 also illustrates a side view of an alternate vertical drive member of 32 which is described in detail below for adjusting the relative vertical positions of filling guide members or plates and guide members as described below. Dial 33 is used to indicate the relative vertical displacement of these members.

It will be recognized by those skilled in the art that the illustrated embodiment is exemplary only and that a variety of alterations may be made. For example, it is unnecessary that the filling station be mobile as shown. Rather, the present invention will work equally well in a fixed station as opposed to a mobile station. Additionally, as shown below, in the preferred exemplary embodiment, the vertical displacement mechanism 22 adjusts a height of a solid pharmaceutical product package. Those skilled in the art will recognize that it is equivalent to the disclosed embodiment to adjust the relative height of the pharmaceutical product package filling guide in relation to the product packaging. Specifically, rather than moving the product packaging upward, the assembly of plates and guide members can be moved downward. All that is necessary is that there be relative vertical motion between the template and the product packaging material in order to achieve the advantages and benefits of the present invention.

Figure 2:
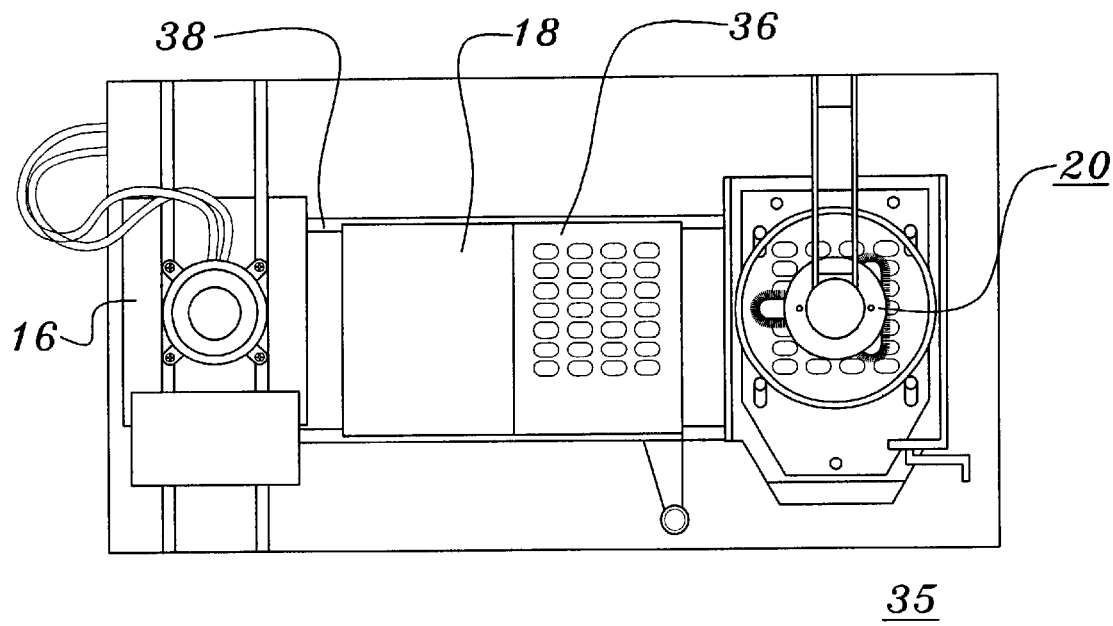
FIG. 2 is a top plan view of an exemplary embodiment of the present invention.

FIG. 2 is a top plan view of the filling station illustrated in FIG. 1. As shown in FIG. 2 generally at 35, a sealing station 16 is located adjacent to an inspection/packaging removal and insertion station 18. As is known in the art, a solid pharmaceutical product package card may be inserted into the machine at station 18 where it is typically placed on a package guide or support 36. The card is typically comprised of a cardboard sheet member having a plurality of openings formed therein. A clear plastic sheet member having a plurality of protruding cavities formed therein is placed onto the cardboard sheet member such that the clear plastic cavity members align with the openings in the cardboard sheet member and protrude to an opposite side of the cardboard sheet member. This is conventional and is well known in the art. The product package guide or support 36 has a plurality of openings which correspond to the cavities in product packaging material such that the cavities of the packaging material may be located within these openings.

Figure 3:
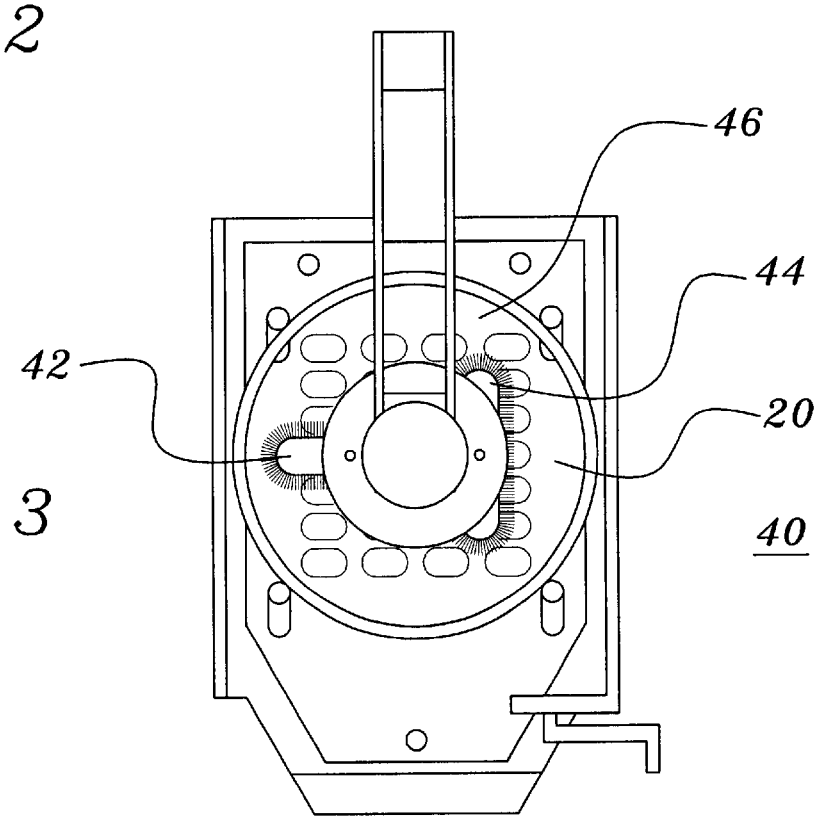
FIG. 3 is a top plan view of the filling station of an exemplary embodiment of the present invention.

A mechanical pneumatically driven horizontal drive mechanism 38 moves the empty pharmaceutical product package guide and package beneath a product package filling guide in the filling station 20. FIG. 3 illustrates a top plan view of the solid pharmaceutical filling station 20 which is shown generally at 40. As shown in FIG. 3, the product package filling station 20 includes a plurality of brush members 42, 44 that are used to manipulate individual doses of solid pharmaceuticals into each of the openings in the filling guide 46 which correspond with cavities in the product packaging material. As is known in the art, the product package filling guide cavities are respectively filled with the desired number of individual solid pharmaceutical doses. This is usually done one dose at a time so that each cavity has a single solid pharmaceutical product. The specific details of the filling process is illustrated below.

Figure 4:
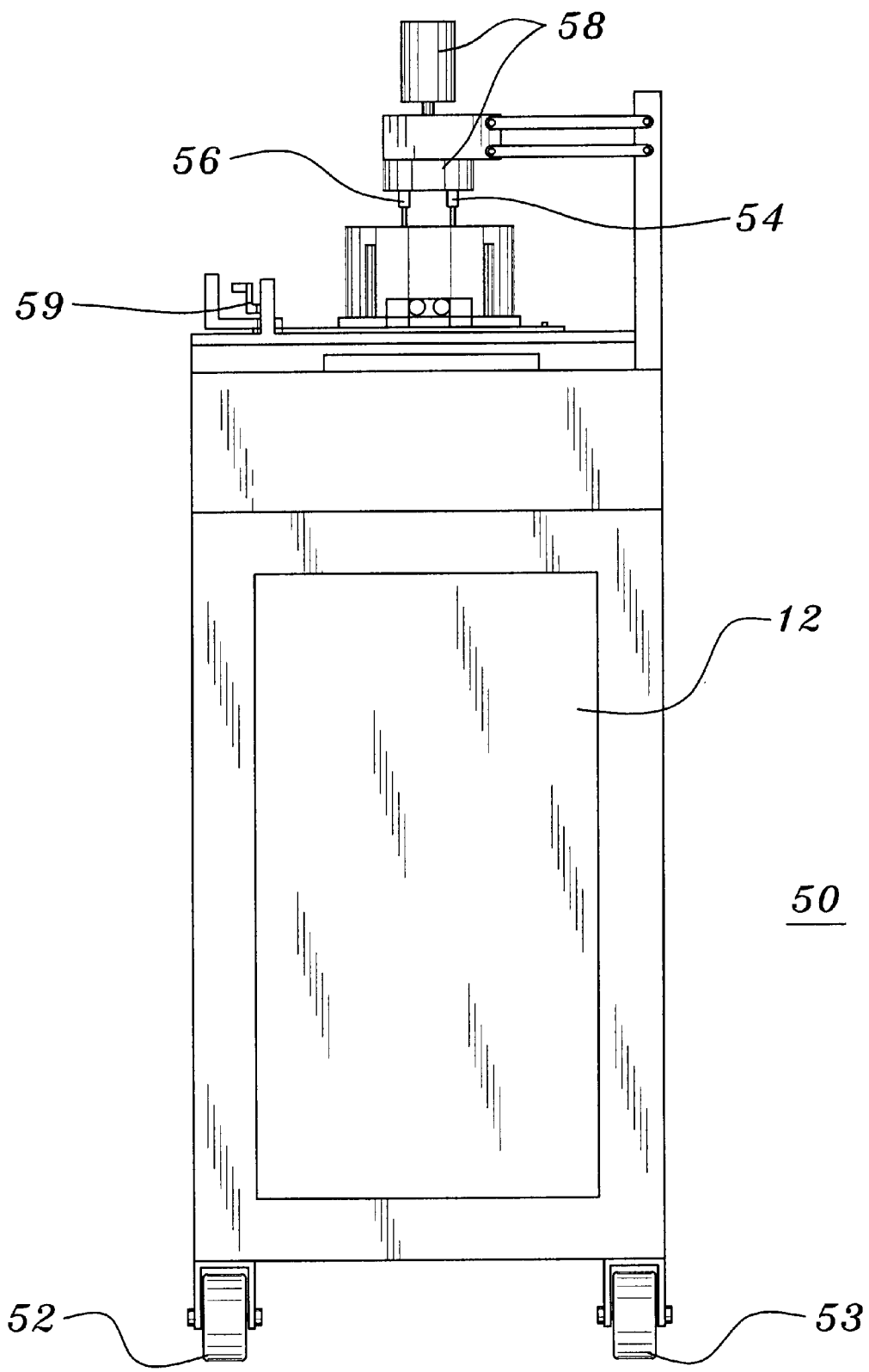
FIG. 4 is a side view of an exemplary embodiment of the present invention.

FIG. 4 illustrates a side view of an exemplary embodiment of the mobile product package filling station. In this embodiment, which is shown generally at 50, the mobile product package filling station 12 is mounted on wheels 52, 53. This side view illustrates support arms 56, 57 which support brushes 42, 44 shown in FIG. 3. The brushes are mechanically driven by a motor 58 which provides rotation, vibration or other mechanical displacement of the brushes which are in contact with solid pharmaceuticals in order to move solid pharmaceutical doses into various openings as described in detail below. FIG. 4 illustrates a side view of the filling guide displacement mechanism wherein the handle 59 is utilized in order to provide vertical displacement of the filling guide members as further described below.

Figure 5:
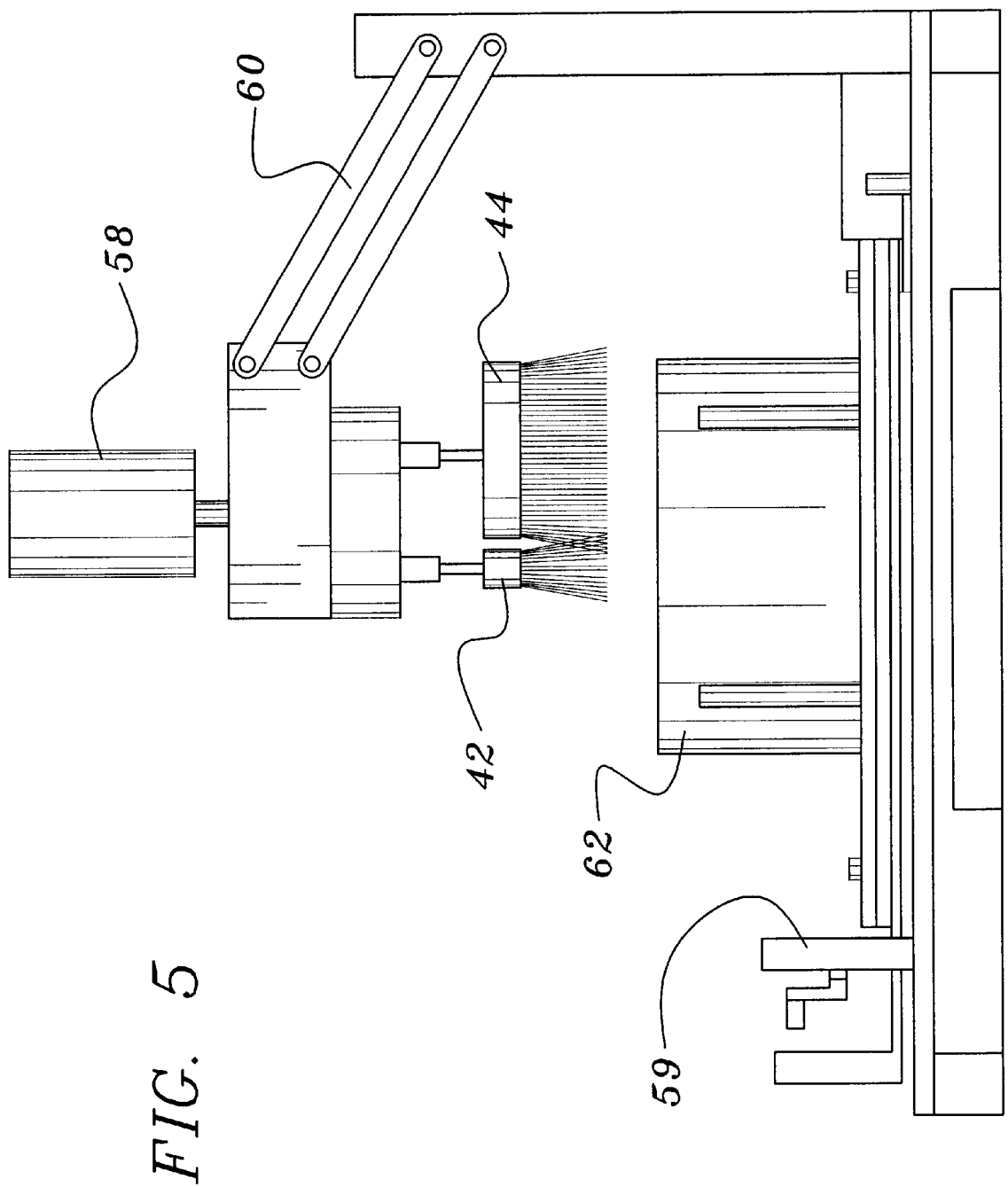
FIG. 5 is a side view of the filling station of an exemplary embodiment of the present invention.

FIG. 5 illustrates the sweeping mechanisms 42, 44 for sweeping solid pharmaceutical doses into the desired cavities of a product package template. Sweeping members 42 and 44 are driven by motor 58. A mechanical arm 60 selectively places the sweep members 42, 44 at a top surface of the product package template which is described in more detail below. Sweeping members 42, 44 move solid pharmaceuticals across openings in the filling guide and a desired number of solid pharmaceuticals enter the filling guide as noted. The solid pharmaceutical doses are advantageously located within vertical container wall 62 in order to ensure that the solid pharmaceutical doses remain adjacent to the openings in guide members so that the packaging may be filled more quickly by movement of the brushes 42, 44.

Figure 6:
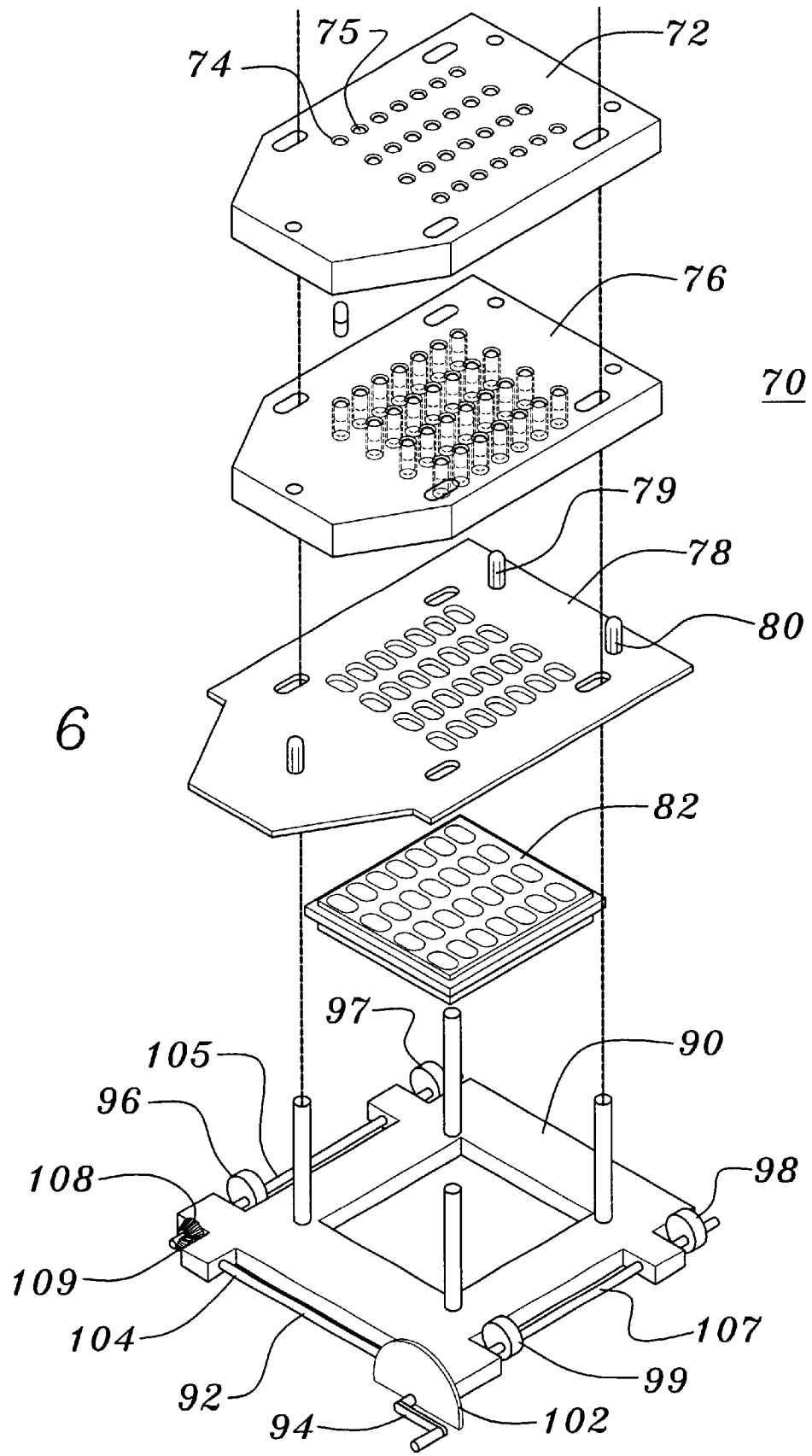
FIG. 6 illustrates the details of the filling guides of an exemplary embodiment of the present invention.

FIG. 6 illustrates an exemplary embodiment of the product package filling guides of the present invention which are shown generally at 70. As shown in FIG. 6, a first initial filling guide plate 72, preferably made of metal, is formed closest to and is in contact with a source of solid pharmaceutical members which have not been shown for the sake of convenience. Specifically, plate 72 forms the bottom of container 62 illustrated in FIG. 5. A top surface of this initial filling guide member is used to support a source or supply of solid pharmaceuticals. Initial filling guide plate 72 has a plurality of openings 74, 75 etc. which are arranged to correspond to the openings in the product package to be filled. A shifting guide plate 76 having a plurality of cavities formed therein which correspond to the plurality of holes formed in the fixed metal guide 72 is initially located directly beneath the fixed metal guide 72 such that the cavities of shifting guide plate 76 are directly below openings 74, 75 etc. During the initial filling process, the sweeping action of sweep members 42, 44 position pills into each of the cavities in shifting guide plate 76 after passing through openings 74, 75 in initial guide plate 72. Filling of the openings in the shifting guide plate 76 easily takes place because the openings in the initial filling guide plate 72 are initially located directly above the corresponding openings in shifting guide plate 76. A further shifting guide plate 78, preferably made from metal, is secured to plastic shifting guide plate 76 via a plurality of tab members 79, 80.

Those skilled in the art will appreciate that although tab members 79 and 80 have been selected for securing shifting guide plate 78 to plastic shifting guide member 76, it will be appreciated that any known method of mechanically securing one plate to another with suffice. In yet a further alternate exemplary embodiment shifting guide members 76 and 78 are molded together to form a single shifting guide member. This single shifting guide member of the alternate embodiment may be either formed entirely of plastic or metal but his preferably formed from a solid plastic. In the first preferred exemplary embodiment, shifting guide plate 78 is preferably formed of metal in order to provide greater support for plastic shifting guide plate 76.

A further dropping guide plate 82, also preferably made of plastic, is secured within housing 90. The combination of shifting guide plates 76, 78, (or in the alternative embodiment where a single shifting guide member is substituted this single member is capable of horizontally sliding) are capable of simultaneously horizontally sliding in relation to plates 72 and 82. The relative displacement of plates 76 and 78 with respect to initial guide plate 72 and dropping guide plate 82 during the filling process is such that openings in plates 76, 78 align when horizontally shifted with corresponding openings in dropping guide 82. This alignment allows solid pharmaceuticals to drop directly into corresponding openings in a solid pharmaceutical product package which is not shown for the sake of convenience. Prior to this horizontal shift, the product package is raised by the vertical drive mechanism 22 illustrated in FIG. 1 such that the top surface of the product package located within the product support 36 illustrated in FIG. 2 is adjacent to bottom surface of dropping guide member 82. Initial guide plate 72 and dropping guide plate 82 remain static when the dropping shift of guide plates 76 and 78 takes place. This prevents additional solid pharmaceuticals from dropping into the packaging material because the openings 74, 75 in initial guide plate 72 are no longer aligned with the cavities formed in plates 76 and 78. Specifically, solid portions of these plates block additional solid pharmaceuticals from dropping.

It is only after the product package material and its template or support 36 are positioned and aligned with openings in dropping guide plate 82 that the middle plates 76, 78 are shifted such that their openings are aligned with the cavities and guide members 69 thereby allowing any pills positioned within the cavities of guide plates 76, 78 to fall into the product packaging cavities. As shown in FIG. 6, an elongated pill member is positioned vertically within the cavities of plastic plate 76 by being swept into these openings by sweep arms 42 and 44. It is important to recognize that openings 74, 75 are beveled in order to allow elongated solid pharmaceuticals to drop easily into cavities in plates 76.

FIG. 6 also illustrates vertical shifting mechanism 92 which is comprised of handcrank 94 and cams 96, 97, 98 and 99. Gear members 101 and 102 allow handcrank 94 to translate the motion of handcrank 94 into vertical displacement by simultaneously moving cams 96, 97, 98 and 99 which are attached to rods 105,107. Specifically, handcrank 94 turns gear members 101 and 102 which rotate rods 104 and 107 as well as rod 105 through additional gear members 108,109 and accordingly displace cams 96, 97, 98 and 99. The cams are used to shift the bottom of plate 78 upward to form spacing between plate 78 and dropping guide 82.

Figure 7:
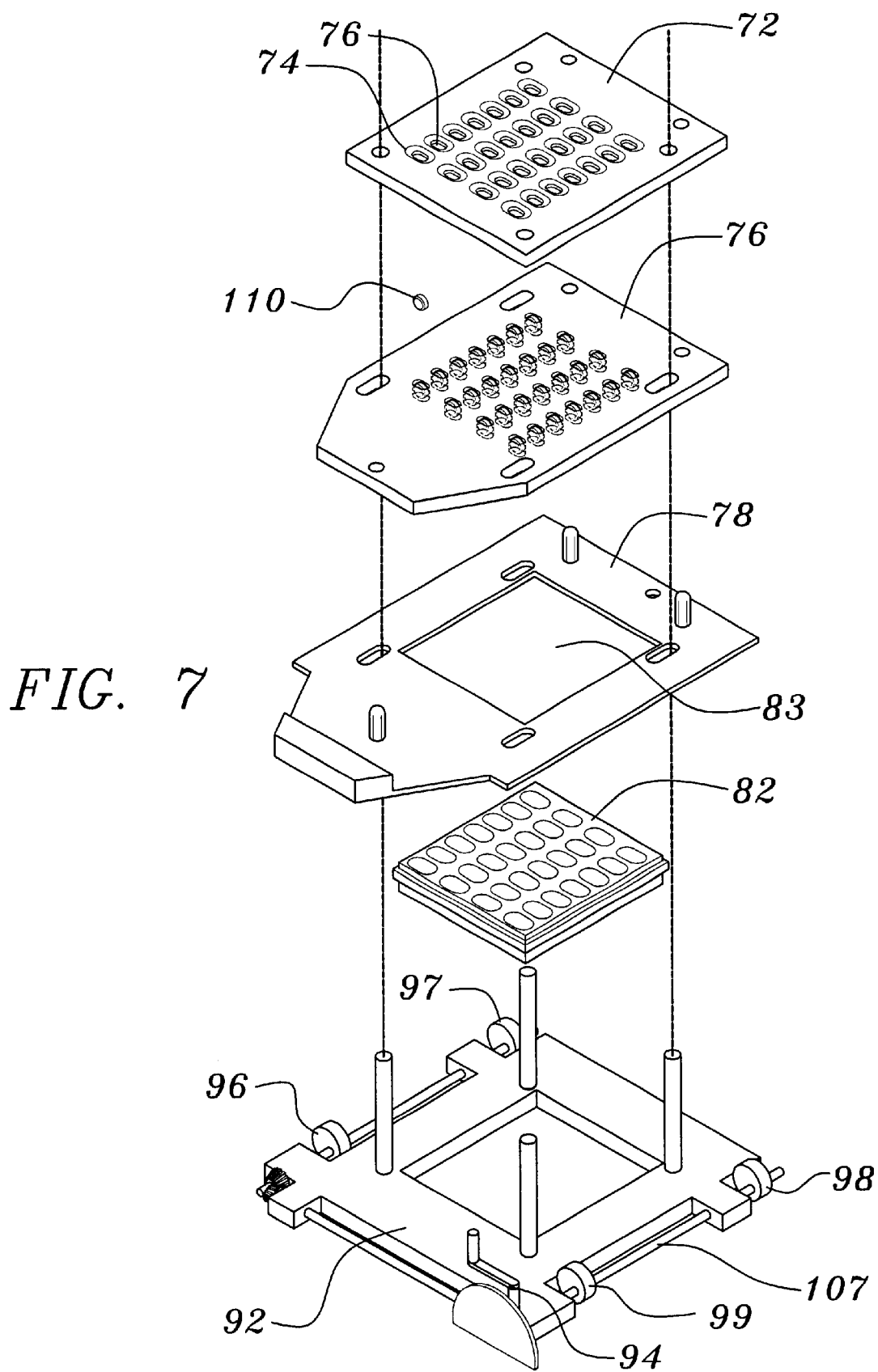
FIG. 7 illustrates the details of an alternate embodiment of the filling guides of an exemplary embodiment of the present invention.
Figure 8:
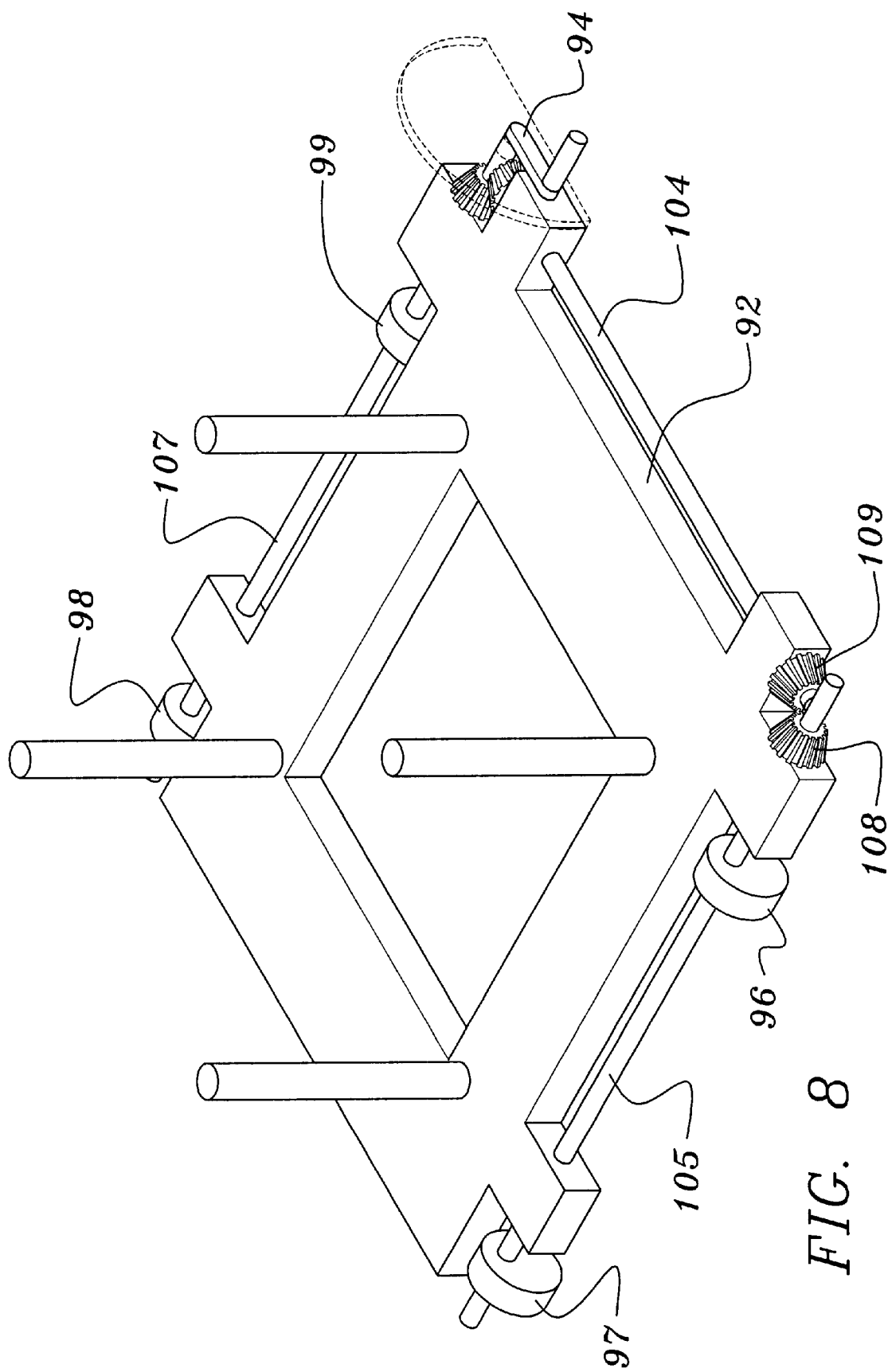
FIG. 8 illustrates an exemplary embodiment of a lifting mechanism.

FIG. 7 illustrates an alternate embodiment of the present invention for thin, round pills wherein plate 72 is shown as having openings which are capable of accepting a single pill from the sweeping action of members 47 and 48 and aligning these pills on their sides. This alignment of the pills allows them to directly drop into cavities formed in plate 76 as shown. It is preferred that the cavities in plate 76 are formed to accept the pills when aligned vertically as shown. Specifically note solid pharmaceutical 110 which illustrates that preferred relationship. FIG. 8 also illustrates an alternate embodiment wherein plate 78 has an opening for receiving dropping guide member 82. In this embodiment, the vertical displacement element 92 shifts the vertical position of plates 72, 76, 78 such that dropping guide 82 may be located within opening 83 of plate 78. Opening 83 is sufficiently large to allow horizontal shifting of plates 76 and 78 in order to align cavities of plate 76 with cavities of dropping guide 82.

FIG. 8 illustrates the details of the vertical displacement mechanism for adjusting the vertical position of plates 72, 76, 78 as described above.

During operation of the filling machine a person inserts the product package into product package support 36 shown in FIG. 2. The product package traverses along guide rails in the horizontal direction. Once the combination of the product package and product package template or support 36 are positioned in the desired location beneath the dropping guide member plate 82 simultaneously filling of the package cavities may be triggered. In the preferred exemplary embodiment, an electronic photosensor is used to verify the position of the product package and product package support and proper registration beneath dropping guide 82. Horizontal displacement of plates 76 and 78 trigger the dropping of solid pharmaceuticals into the product package. It is preferred that the solid pharmaceuticals be preloaded into the cavities of plates 76. Horizontal displacement may be triggered automatically or via manual displacement. Prior to filling of the product package the product package support 36 is lifted toward the base of the dropping guide 82 by vertical lift mechanism 22 illustrated in FIG. 1. W The vertical displacement allows the product package member to move adjacent the bottom of plate 82, thereby preventing bounce of a pill dropped through guide member 82 into the product package cavity from one product package cavity to another or from a package cavity out of the product packaging material. Additionally, the vertical displacement prevents shear of any pills which may extend above a top surface of the product packaging material. After filling is complete, product package support or platten is then dropped back to its initial position.

Thereafter, the product package 24 and product package template slide along guide rails to return to inspection station where the product package cavities may be inspected by an operator to ensure that the appropriate doses have been included in the product packaging material.

It will be appreciated by those skilled in the art that the mechanical actuators which, in the preferred embodiment, are illustrated as air driven pistons may be replaced by any mechanical forced-generating mechanism. For example, alternate embodiments would include such things as electro mechanical drives and electromagnetic drives as well. All that is necessary is that the product package material and template move in relation to the guide member.

As recognized above, in an alternate embodiment, the entire stack of guide members may alternately be moved vertically in relation to the product package and support 36. Other variations and modifications may be made to the structures and methods of the present invention yet, nevertheless, fall within the scope of the appended claims.

We claim:

1. A solid pharmaceutical product package filling machine comprising:
    a filling station comprising;
        an initial filling guide member having a plurality of cavities;
        a temporary storage guide member having a corresponding plurality of cavities;
        a dropping guide member having a corresponding plurality of cavities; and
        wherein the temporary storage guide member may be horizontally displaced with respect to the initial filling guide and the dropping guide member in order to drop solid pharmaceuticals into product package cavities and further including means for effecting the relative vertical separation of the initial filling guide member and a product package.

2. The solid pharmaceutical product package filling machine of claim 1, wherein the means for effecting the relative vertical separation of the initial filling guide member and a product package is comprised of a cam member.

3. The solid pharmaceutical product package filling machine of claim 1, wherein the means for effecting the relative vertical separation of the initial filling guide member and a product package is comprised of a solenoid.

4. The solid pharmaceutical product package filling machine of claim 1, wherein the means for effecting the relative vertical separation of the initial filling guide member and a product package is comprised of a pneumatic drive mechanism.

5. A method of filling a solid pharmaceutical product package comprising the steps of:
    providing an initial filling guide member having a plurality of cavities;
    positioning a temporary storage guide member having a corresponding plurality of cavities beneath the filling guide;
    positioning a dropping guide member having a corresponding plurality of cavities beneath the initial filling guide; and
    effecting the relative vertical separation of the initial filling guide member and a product package.

6. The method of filling a solid pharmaceutical product package of claim 5, wherein the step of effecting the relative vertical separation of the initial filling guide member and a product package is comprised of rotating a cam member.

7. The method of filling a solid pharmaceutical product package of claim 5, wherein the step of effecting the relative vertical separation of the initial filling guide member and a product package is comprised of activating a solenoid.

8. The method of filling a solid pharmaceutical product package of claim 5, wherein the step of effecting the relative vertical separation of the initial filling guide member and a product package is comprised of activating a pneumatic drive mechanism.

* * * * *